US009020197B2

(12) United States Patent
Nakaoka

(10) Patent No.: US 9,020,197 B2
(45) Date of Patent: *Apr. 28, 2015

(54) MOTION ANALYZING APPARATUS

(71) Applicant: Seiko Epson Corporation, Tokyo (JP)

(72) Inventor: Yasushi Nakaoka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/024,947

(22) Filed: Sep. 12, 2013

(65) Prior Publication Data

US 2014/0019083 A1 Jan. 16, 2014

Related U.S. Application Data

(63) Continuation of application No. 13/285,083, filed on Oct. 31, 2011, now Pat. No. 8,565,483.

(30) Foreign Application Priority Data

Nov. 19, 2010 (JP) .................................. 2010-259234

(51) Int. Cl.
*G06K 9/00* (2006.01)
*G01P 13/00* (2006.01)
*A63B 69/36* (2006.01)
*A63B 69/38* (2006.01)
*A63B 57/00* (2006.01)

(52) U.S. Cl.
CPC ................. *G01P 13/00* (2013.01); *A63B 69/36* (2013.01); *A63B 69/38* (2013.01)

(58) Field of Classification Search
USPC ........... 382/10, 103, 106–107, 155, 162, 168, 382/181, 189, 209, 232, 254, 274, 276, 382/286–295, 305, 312; 345/156; 702/141; 473/200, 455, 190; 340/573.1
See application file for complete search history.

(56) References Cited

U.S. PATENT DOCUMENTS

| 5,694,340 A * | 12/1997 | Kim .............................. 702/141 |
| 7,952,483 B2 * | 5/2011 | Ferguson et al. .......... 340/573.1 |
| 2004/0260468 A1 | 12/2004 | Bang et al. |
| 2005/0272516 A1 * | 12/2005 | Gobush ........................ 473/200 |
| 2008/0033679 A1 | 2/2008 | Yamada et al. |
| 2009/0298622 A1 * | 12/2009 | Roberts ......................... 473/455 |
| 2010/0302142 A1 * | 12/2010 | French et al. ................. 345/156 |

FOREIGN PATENT DOCUMENTS

| CN | 101549205 A | 10/2009 |
| JP | A-2003-299757 | 10/2003 |

(Continued)

*Primary Examiner* — Seyed Azarian
(74) *Attorney, Agent, or Firm* — Oliff PLC

(57) ABSTRACT

A sensor unit is installed to a target object and detects a given physical amount. A data acquisition unit acquires output data of the sensor unit in a period including a first period for which a real value of a value of m time integrals of the physical amount is known and a second period that is a target for motion analysis. An error time function estimating unit performs m time integrals of the output data of the sensor unit and estimates a time function of an error of a value of the physical amount detected by the sensor unit with respect to the real value of the value of the physical amount detected by the sensor unit based on a difference between a value of m time integrals of the output data and the real value for the first period.

7 Claims, 9 Drawing Sheets

(56) References Cited

FOREIGN PATENT DOCUMENTS

| | | |
|---|---|---|
| JP | A-2004-024488 | 1/2004 |
| JP | A-2005-10157 | 1/2005 |
| JP | A-2007-130172 | 5/2007 |
| JP | A-2009-287940 | 12/2009 |
| WO | WO 2006/016671 A1 | 2/2006 |

\* cited by examiner

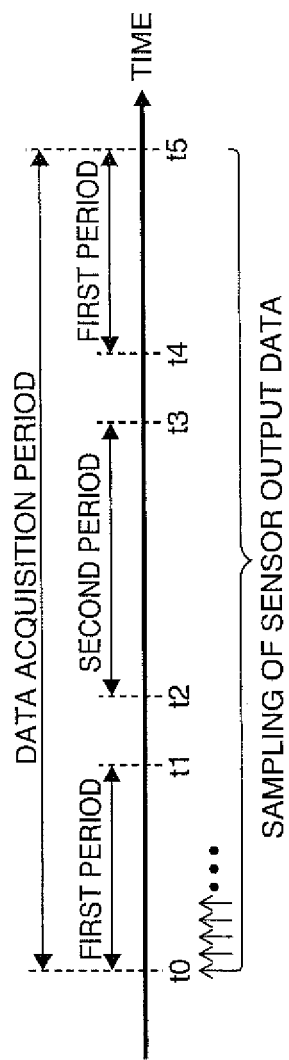
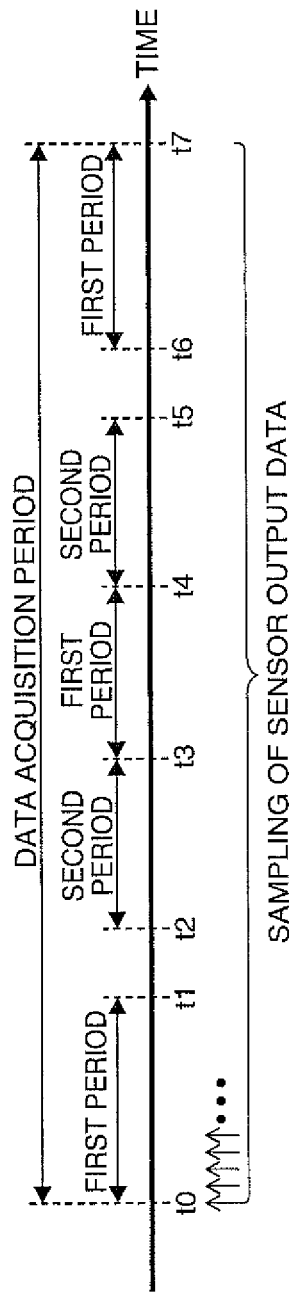
FIG. 3A
FIG. 3B

MOTION ANALYZING APPARATUS

This is a Continuation of application Ser. No. 13/285,083 filed Oct. 31, 2011. The disclosure of the prior application is hereby incorporated by reference herein in its entirety.

BACKGROUND

1. Technical Field

The present invention relates to a motion analyzing apparatus.

2. Related Art

In various fields, apparatuses that analyze the motion of a person or an object are necessary. For example, by analyzing the swing trajectory of a tennis racket or a golf club, the form of baseball pitching or batting, and the like and clarifying points to be improved based on the analysis result, game power can be improved.

Currently, as practical motion analyzing apparatuses, apparatuses that analyze a motion by consecutively photographing a measurement object, to which a mark is attached, using an infrared camera or the like and calculating the motion trajectory of the mark using consecutive photographed images are generally used.

JP-A-2004-24488 is an example of the related art.

However, in such apparatuses, since an infrared camera used for photographing images is necessary, the size of the apparatuses is in consequence large, and, accordingly, there is a problem in that it is difficult to handle the apparatuses. For example, in a case where the images of a tennis practice are desired to be acquired through photographing at a plurality of angles, it is necessary to move the position of the infrared camera or change the direction of a player in accordance with the desired photographing angles.

In contrast to this, recently, an apparatus was proposed which analyzes the motion of a measurement object based on output data of a small inertial sensor by installing the inertial sensor in the measurement object. Such an apparatus does not need an infrared camera, and accordingly there is an advantage of easy handling. For example, the velocity v(t) and the position p(t) of the measurement object can be calculated by performing a time integration process as shown in the following Equations (1) and (2) for an acceleration value a(t) detected by an acceleration sensor.

$$v(T) = \int_0^T a(t)\,dt + v_0 \quad (1)$$

$$p(T) = \int_0^T v(t)\,dt + p_0 \quad (2)$$
$$= \int_0^T \int_0^t a(\tau)\,d\tau\,dt + v_0 T + p_0$$

However, generally, an error other than a value to be observed is included in the output value of an inertial sensor. Accordingly, for example, the output data x(t) of the acceleration sensor can be represented as the following Equation (3) by using an acceleration value a(t) and an error $\epsilon(t)$.

$$x(t) = a(t) + \epsilon(t) \quad (3)$$

Accordingly, in a case where the velocity v(t) and the position p(t) of a measurement object are calculated by performing a time integration process as represented in the following Equations (4) and (5) based on the output data x(t) of the acceleration sensor, the error $\epsilon(t)$ is integrated with respect to time as well. Therefore errors in the velocity v(t) and the position p(t) rapidly increase in accordance with the elapse of time t.

$$\int_0^T x(t)\,dt = v(T) + \int_0^T \epsilon(t)\,dt + c_1 \quad (4)$$

$$\int_0^T \int_0^t x(\tau)\,d\tau\,dt = p(T) + \int_0^T \int_0^t \epsilon(\tau)\,d\tau\,dt + c_1 T + c_2 \quad (5)$$

In other words, in a motion analyzing apparatus using an inertial sensor, the characteristics of the sensor are not sufficient in practice, and in a case where the posture, the velocity, the position, and the like are calculated by performing an integration process for the output data of the inertial sensor, an error included in the output of the sensor noticeably increases through the integration process, whereby there is problem in that a sufficient analysis (measurement) capability is not acquired.

SUMMARY

An advantage of some aspects of the invention is that it provides a motion analyzing apparatus that can be easily handled and provide analysis information with sufficient accuracy.

(1) An aspect of the invention is directed to a motion analyzing apparatus including: a sensor unit that is installed to a target object and detects a physical amount; a data acquisition unit that acquires output data of the sensor unit in a period including a first period for which a real value of a value of m time integrals (here, m is an integer equal to or greater than one) of the physical amount is known and a second period that is a target for motion analysis; an error time function estimating unit that performs m time integrals of the output data and estimates a time function of an error of a value of the physical amount detected by the sensor unit with respect to the real value based on a difference between a value of m time integrals of the output data and the real value for the first period; a data correcting unit that corrects a value of m time integrals of the output data for the second period based on an estimation result of the error time function estimating unit; and a motion analysis information generating unit that generates motion analysis information of the target object based on the value of the m time integrals for the second period that is corrected by the data correcting unit.

The target object to be analyzed may be a person or an object (for example, an exercise tool, a vehicle, or the like) other than a person.

The information used for analyzing the motion of a target object, for example, may be trajectory information of the target object or information of a change in the speed of the target object, or the like.

The m time integrals may be an m time integrals in a continuous time system or an m time integrals (m time differentials) in a discrete time system.

According to the above-described motion analyzing apparatus, the detection error of the sensor unit is estimated as a time function, and the m time integrals of the physical amount of the detection target is corrected by using the estimated time function of the error, whereby analysis information having sufficient accuracy can be generated. In addition, a sensor is used instead of an infrared camera, the configuration can be simplified, and the handling thereof is easy.

(2) In the above-described motion analyzing apparatus, the error time function estimating unit may estimate the time function of the error by approximating the time function of the error as a polynomial equation and calculating coefficients of the polynomial equation.

In such a case, the time function of the detected error can be estimated with sufficient accuracy through relatively simple calculation. In addition, the order of the polynomial may be determined based on the accuracy required for the motion analysis.

In addition, for example, the error time function estimating unit may calculate coefficients of the polynomial equation by solving over-determined simultaneous equations that are acquired by approximating the error of the m time integrals of the data acquired by the data acquisition unit for the first period with respect to the real value to the value of the m time integrals of the polynomial in the first period of the polynomial equation.

As above, by setting up the over-determined simultaneous equations by acquiring more data in the first period, the estimation accuracy of the time function of the detected error can be increased. In addition, for example, the over-determined simultaneous equations may be solved by using a least squares method.

(3) The above-described motion analyzing apparatus may be configured such that a plurality of the first periods is set, and the error time function estimating unit estimates the time function of the error based on data for each of the plurality of the first periods that is acquired by the data acquiring unit.

By arranging a plurality of the first periods as above, the estimation accuracy of the time function of the detected error can be increased further.

(4) The above-described motion analyzing apparatus may be configured such that at least one of the plurality of the first periods is a period before start of the second period, and at least one of the plurality of the first periods is a period after end of the second period.

In such a case, the estimation accuracy of the time function of the detected error for the second period as a target of the motion analysis can be further increased, and accordingly, the motion analysis information having higher accuracy can be generated.

(5) in the above-described motion analyzing apparatus, the first period may be a period in which the target object is stopped.

In such a case, for example, the speed, the posture, and the position of the target object for the first period can be known.

(6) In the above-described motion analyzing apparatus, the sensor unit may detect at least one of acceleration and angular velocity as the physical amount.

BRIEF DESCRIPTION OF THE DRAWINGS

The invention will be described with reference to the accompanying drawings, wherein like numbers reference like elements.

FIGS. 3A and 3B are diagrams showing examples of a data acquisition period, a first period, and a second period.

DESCRIPTION OF EXEMPLARY EMBODIMENTS

Hereinafter, a preferred embodiment of the invention will be described in detail with reference to the accompanying drawings. The embodiment described here is not for purposes of inappropriately limiting the content of the invention that is defined in the claims. In addition, not all the configurations described below are determined as essential constituent elements of the invention.

Figure 1:
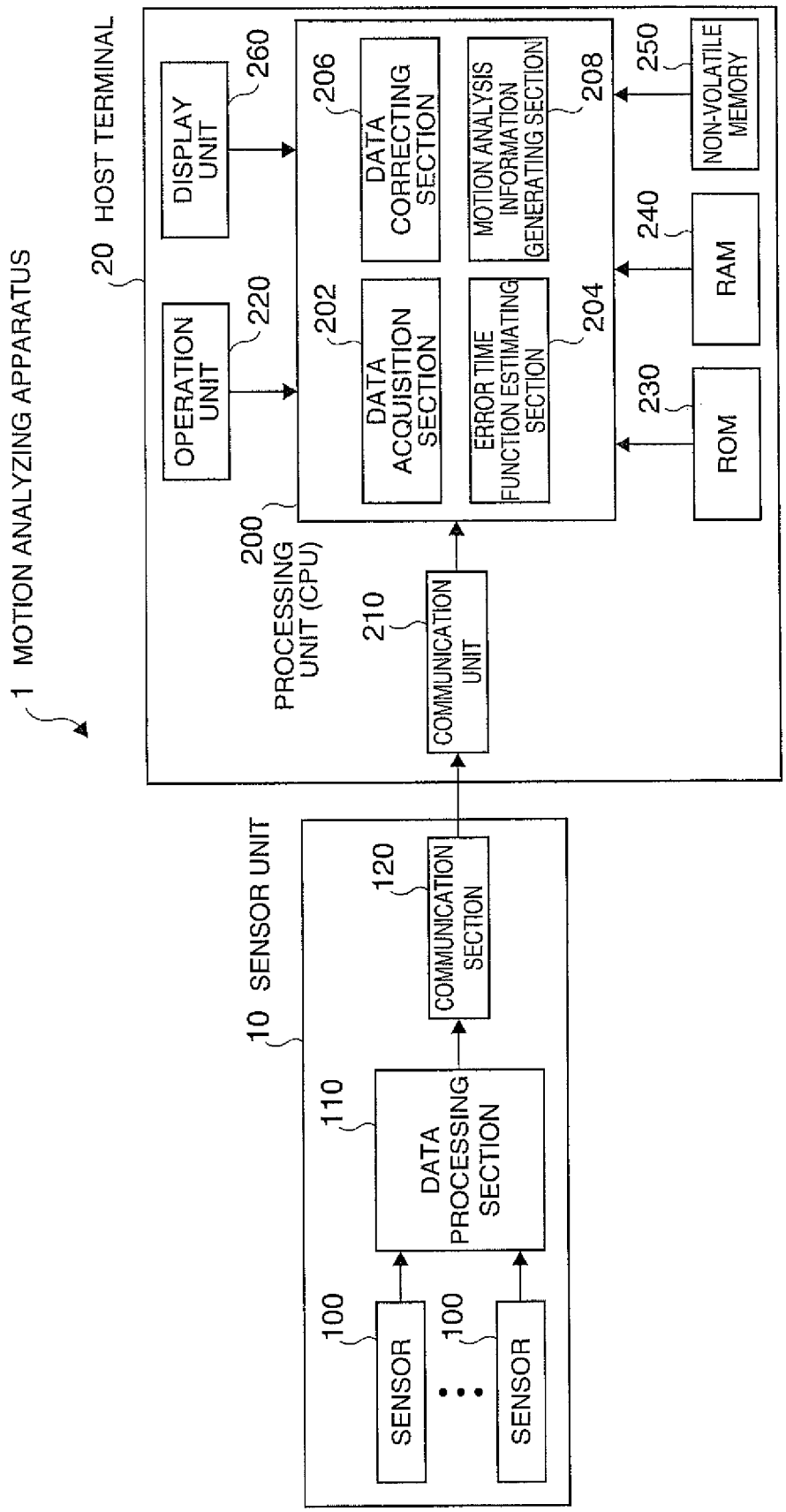
FIG. 1 is a diagram showing the configuration of a motion analyzing apparatus according to this embodiment.

FIG. 1 is a diagram showing the configuration of a motion analyzing apparatus according to this embodiment.

The motion analyzing apparatus 1 according to this embodiment is configured so as to include one or a plurality of sensor units 10 and a host terminal 20 and analyzes the motion of a target object. The sensor unit 10 and the host terminal 20 are interconnected in a wired or wireless manner.

The sensor unit 10 is installed to a target object for motion analysis and performs a process of detecting a given physical amount. In this embodiment, the sensor unit 10 is configured so as to include one or a plurality of sensors 100, a data processing section 110, and a communication section 120.

The sensor 100 is a sensor that detects a given physical amount and outputs a signal (data) according to the magnitude of the detected physical amount (for example, acceleration, angular velocity, speed, angular acceleration, or the like). For example, the sensor 100 is an inertial sensor.

The data processing section 110 synchronizes output data of each sensor 100, forms a packet in which the data is combined with time information and the like, and outputs the packet to the communication section 120. In addition, the data processing section 110 may perform the process of correcting the bias of the sensor 100 and correcting the temperature. Alternatively, the function of bias correction and temperature correction may be introduced into the sensor 100.

The communication section 120 performs the process of transmitting the packet data received from the data processing section 110 to the host terminal 20.

The host terminal 20 is configured so as to include a processing unit (CPU) 200, a communication unit 210, an operation unit 220, a ROM 230, a RAM 240, a non-volatile memory 250, and a display unit 260.

The communication unit 210 performs the process of receiving data transmitted from the sensor unit 10 and transmitting the data to the processing unit 200.

The operation unit 220 performs the process of acquiring operation data from a user and transmitting the operation data to the processing unit 200. The operation unit 220, for example, is a touch panel-type display, buttons, keys, a microphone, or the like.

The ROM 230 stores programs used for performing various calculation processes and control processes of the processing unit 200, various programs and data for implementing application functions, and the like.

The RAM 240 is used as a work area of the processing unit 200 and is a storage unit that temporarily stores a program or data read out from the ROM 230, data input from the operation unit 220, calculation results of the processing unit 200 that are acquired through execution of various programs, and the like.

The non-volatile memory 250 is a recording unit that records data which needs to be stored for a long term out of data generated by the process of the processing unit 200.

The display unit 260 displays the processing result of the processing unit 200 as a text, a graph, or other images. The display unit 260, for example, is a CRT, an LCD, a touch panel-type display, an HMD (head mount display), or the like. In addition, the functions of the operation unit 220 and the display unit 260 may be realized by one touch panel-type display.

The processing unit 200 performs various calculation processes for data received from the sensor unit 10 through the communication unit 210 or various control processes (display control for the display unit 260 or the like) in accordance with programs stored in the ROM 240.

Particularly, in this embodiment, the processing unit 200 serves as a data acquisition section 202, an error time function estimating section 204, a data correcting section 206, and a motion analysis information generating section 208 to be described later.

The data acquisition section 202 performs the process of acquiring output data of the sensor unit 10 in a period including a first period in which the real value of the value of m time integrals of the physical amount as a detection target of the sensor 100 is known and a second period as a motion analysis target. The acquired data, for example, is stored in the RAM 240.

The error time function estimating section 204 calculates m integrals of the output data of the sensor unit 10 and performs the process of estimating a function (hereinafter, referred to as an "error time function) of an error with respect to the real value of the value of the physical amount detected by the sensor unit 10 in time based on a difference between the value of the m time integrals of the output data for the first period and the real value.

The data correcting section 206 performs the process of correcting the value of the m time integrals of the output data of the sensor unit 10 for the second period based on the estimation result of the error time function estimating section 204.

The motion analysis information generating section 208 performs the process of generating information used for analyzing the motion of a target object (hereinafter, referred to as "motion analysis information") based on the value of the m time integrals for the second period that has been corrected by the data correcting section 206. The generated motion analysis information may be displayed as a text, a graph, a diagram, or the like on the display unit 260 or may be output to the outside of the host terminal 20.

Figure 2:
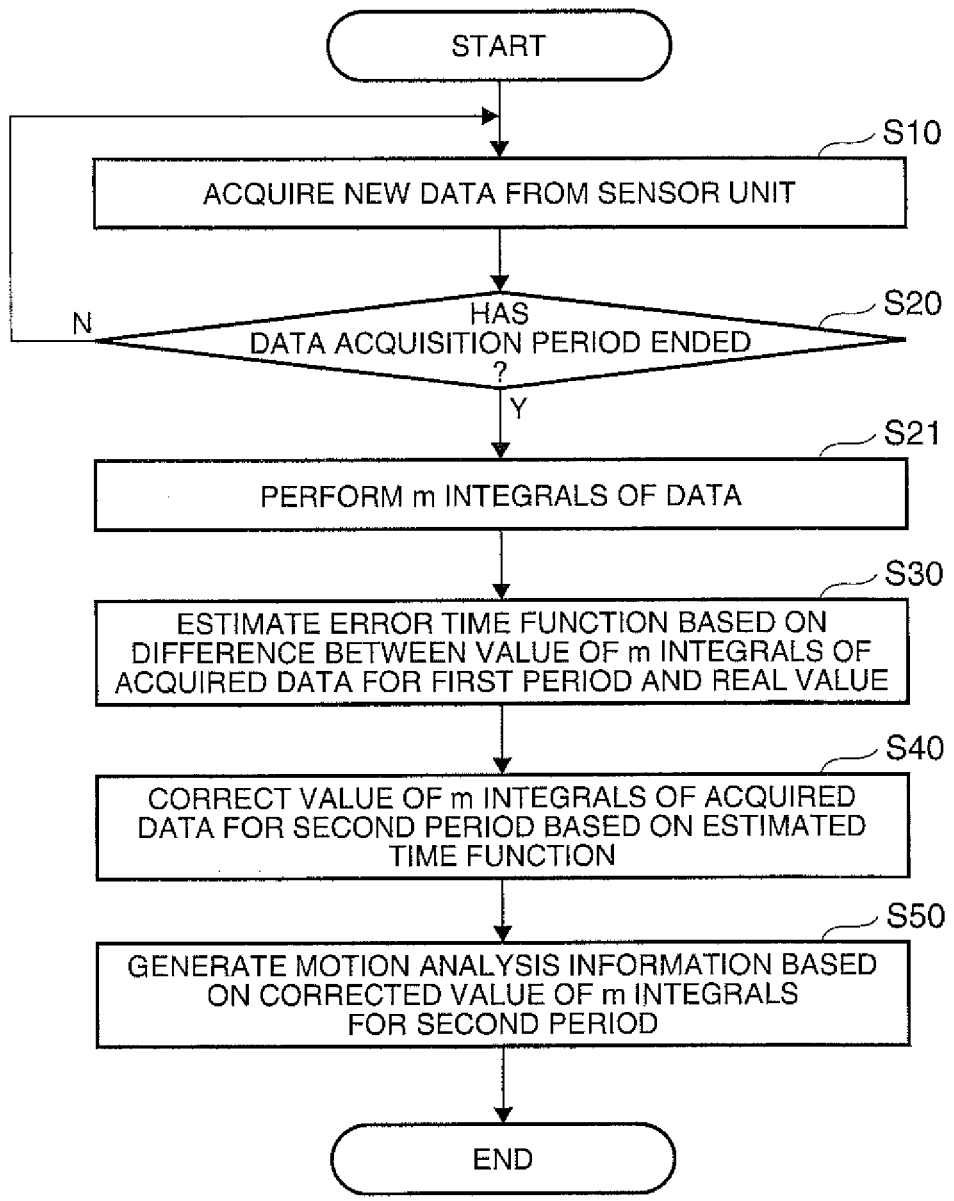
FIG. 2 is a flowchart showing an example of a process of generating motion analysis information by using a processing unit.

FIG. 2 is a flowchart showing an example of the process of generating motion analysis information by using the processing unit 200.

First, the processing unit 200 periodically acquires new data from the sensor unit 10 until a data acquisition period ends (No in Step S20) by using the data acquisition section 202 (Step S10).

Next, when the data acquisition period ends (Yes in Step S20), the processing unit 200 calculates m time integrals of the data (Step S21) in the first period and estimates the error time function based on a difference between the m time integrals of the data acquired in Step S10 and the real value, by using the error time function estimating section 204 (Step S30).

Next, the processing unit 200 corrects the value of the m time integrals of the data acquired in Step S10 for the second period based on the time function estimated in Step S30, by using the data correcting section 206 (Step S40).

Finally, the processing unit 200 generates motion analysis information based on the value of the m integrals for the second period with respect to time, which has been corrected in Step S40, by using the motion analysis information generating section 208 (Step S50).

FIGS. 3A and 3B are diagrams showing examples of the data acquisition period, the first period, and the second period.

In the example shown in FIG. 3A, a second period for which an analysis target object moves is arranged at time t2 to t3, and, before and after the second period, two first periods that are separated in time are arranged at t0 to t1 and t4 to t5. In addition, a data acquisition period is arranged at time t0 to t5, for this data acquisition period, the output data of the sensor unit 10 is sampled (acquired) at a predetermined interval by the host terminal 20. In each of the two first periods, since the real value of m time integrals of the physical amount as the detection target of the sensor unit 10 is known, a difference between the value of m time integrals of the output data of the sensor unit 10 and the real value can be known. An error time function for the output data of the sensor unit 10 can be estimated for the entire data acquisition period based on the information of the difference. In addition, any one of the first period (time t0 to t1) that is arranged first and the first period (time t4 to t5) arranged second may not be provided. However, in order to increase the accuracy of the estimation of the error time function, it is preferable that the first periods are arranged before and after the second period. In order to increase the accuracy of estimation of the error time function, it is effective to estimate the error time function by reflecting random variations of the error that is caused by the variations of the power source, temperature variations, and the like, accordingly, it is preferable that a plurality of the first periods that are separated in time are arranged. Particularly, by arranging the first periods before and after the second period, the accuracy of the estimated error increases for the second period, and accordingly, the accuracy of data correction for the second period can be improved.

In addition, in the example shown in FIG. 3B, two second periods in which the analysis target object moves are arranged at time t2 and t3 and time t4 and t5. The first period (time t3 to t4) is arranged before the second period (time t2 to t3) arranged first, the first period (time t3 to t4) arranged second is arranged between the two second periods, and the first period (time t6 to t7) arranged third is arranged after the second period arranged second. Then, the data acquisition period is arranged at time t0 to t7. For each one of the three first periods, the real value of m integrals of the physical amount as the detection target of the sensor unit 10 is known, a differences between the value of m time integrals of the output data of the sensor unit 10 and a real value can be known. The error time function for the output data of the sensor unit 10 can be estimated for the entire data acquisition period. In addition, in the example shown in FIG. 3B, since two second periods as targets of motion analysis are arranged, by arranging three first periods at positions that are separated in time with the two second periods interposed therebetween, the estimation accuracy of the error time function for the two second periods can be increased. In other words, by arranging the first periods before and after the second period as targets of motion analysis, even in a case where motions of the analysis targets are repeatedly performed over time, the correction accuracy of the data for each second period can be improved.

Estimation of Error Time Function and Data Correction

Next, an example of the technique for estimating the error time function and data correction will be described.

First, in a case where the value of the physical amount as a calculation target of the processing unit 200 at time t is assumed to be $F_m(t)$, and the sensor unit 10 measures the value f(t) of the m-th order derivative function, the following Equation (6) is satisfied.

$$\frac{d^m F_m(t)}{dt^m} = f(t) \quad (6)$$

Here, assuming that the output data x(t) of the sensor unit 10 includes an error $\epsilon(t)$, x(t) can be represented as the following Equation (7).

$$x(t) = f(t) + \epsilon(t) \quad (7)$$

It can be considered that the error time function $\epsilon(t)$ is approximated as an n-th order polynomial equation $\epsilon(t)$ as the following Equation (8).

$$\epsilon(t) \approx g(t) = a_0 + a_1 t + a_2 t^2 + \ldots + a_n t^n = \sum_{k=0}^{n} a_k t^k \quad (8)$$

In $X_m(t)$ that is the result of m time integrals of the output data x(t) of the sensor unit 10, an error component $E_m(t)$ due to an initial state error $\epsilon(t)$ (integral constant) other than the physical amount $F_m(t)$ as a calculation target is included. Accordingly, $X_m(t)$ can be represented as the following Equation (9).

$$X_m(t) = F_m(t) + E_m(t) \quad (9)$$

$$\begin{cases} \frac{d^m X_m(t)}{dt^m} = x(t) \\ \frac{d^m E_m(t)}{dt^m} = \epsilon(t) \end{cases}$$

Considering that the error component $E_m(t)$ can be approximated as a polynomial equation $G_m(t)$ in consideration of the integral constant (initial state error) $c_K$ for the m time integrals of g(t), the following Equations (10) and (11) are satisfied.

$$\frac{d^m G_m(t)}{dt^m} g(t) \quad (10)$$

$$E_m(t) \approx G_m(t) = \sum_{k=0}^{n} \frac{k!}{(k+m)!} a_k t^{k+m} + \sum_{k=0}^{m-1} \frac{c_{m-k}}{k!} t^k \quad (11)$$

Accordingly, in a case where the physical amount $F_m(t_r)$ at specific time $t_r$ is known, the relation represented in the following Equation (12) is satisfied.

$$X_m(t_r) - F_m(t_r) \approx G_m(t_r) = \sum_{k=0}^{n} \frac{k!}{(k+m)!} a_k t_r^{k+m} + \sum_{k=0}^{m-1} \frac{c_{m-k}}{k!} t_r^k \quad (12)$$

By preparing this relation equations of Equation (12) corresponding to the number of each time at which the value of the physical amount as a calculation target is known, for coefficients $a_K$ and $C_K$ of Equation (11) as an approximated polynomial equation, the following Equation (13) as over-determined simultaneous equations as below can be set up.

$$\begin{bmatrix} X_m(t_{r1}) - F_m(t_{r1}) \\ X_m(t_{r2}) - F_m(t_{r2}) \\ X_m(t_{r3}) - F_m(t_{r3}) \\ \vdots \end{bmatrix} \approx U \begin{bmatrix} a_0 \\ a_1 \\ \vdots \\ a_n \end{bmatrix} + V \begin{bmatrix} c_1 \\ c_2 \\ \vdots \\ c_m \end{bmatrix} \quad (13)$$

$$\begin{cases} U = \{u_{ij}\}, \quad u_{ij} = \frac{j!}{(m+j)!} t_{ri}^{m+j} \\ V = \{v_{ij}\}, \quad v_{ij} = \frac{1}{(m-j)!} t_{ri}^{m-j} \end{cases}$$

From Equation (13) as the over-determined simultaneous equations, the coefficients $a_K$ and $C_K$ of Equation (11) as the approximated polynomial equations can be acquired, for example, by using a least-squares method.

$$M = \begin{bmatrix} U & V \end{bmatrix} \quad (14)$$

$$\begin{bmatrix} a_0 \\ a_0 \\ \vdots \\ a_n \\ c_1 \\ c_2 \\ \vdots \\ c_m \end{bmatrix} = (M^T M)^{-1} M^T \begin{bmatrix} X_m(t_{r1}) - F_m(t_{r1}) \\ X_m(t_{r2}) - F_m(t_{r2}) \\ X_m(t_{r3}) - F_m(t_{r3}) \\ \vdots \end{bmatrix} \quad (15)$$

Since the approximated polynomial equations g(t) and $G_m(t)$ are determined by using the coefficients $a_K$ and $C_K$, the physical amount $F_m(t)$ and the value f(t) of the m-th order derivative function thereof can be estimated by using the following Equations (16) and (17).

$$F_m(t) \approx X_m(t) - G_m(t) \quad (16)$$

$$f(t) \approx x(t) - g(t) \quad (17)$$

Figure 4:
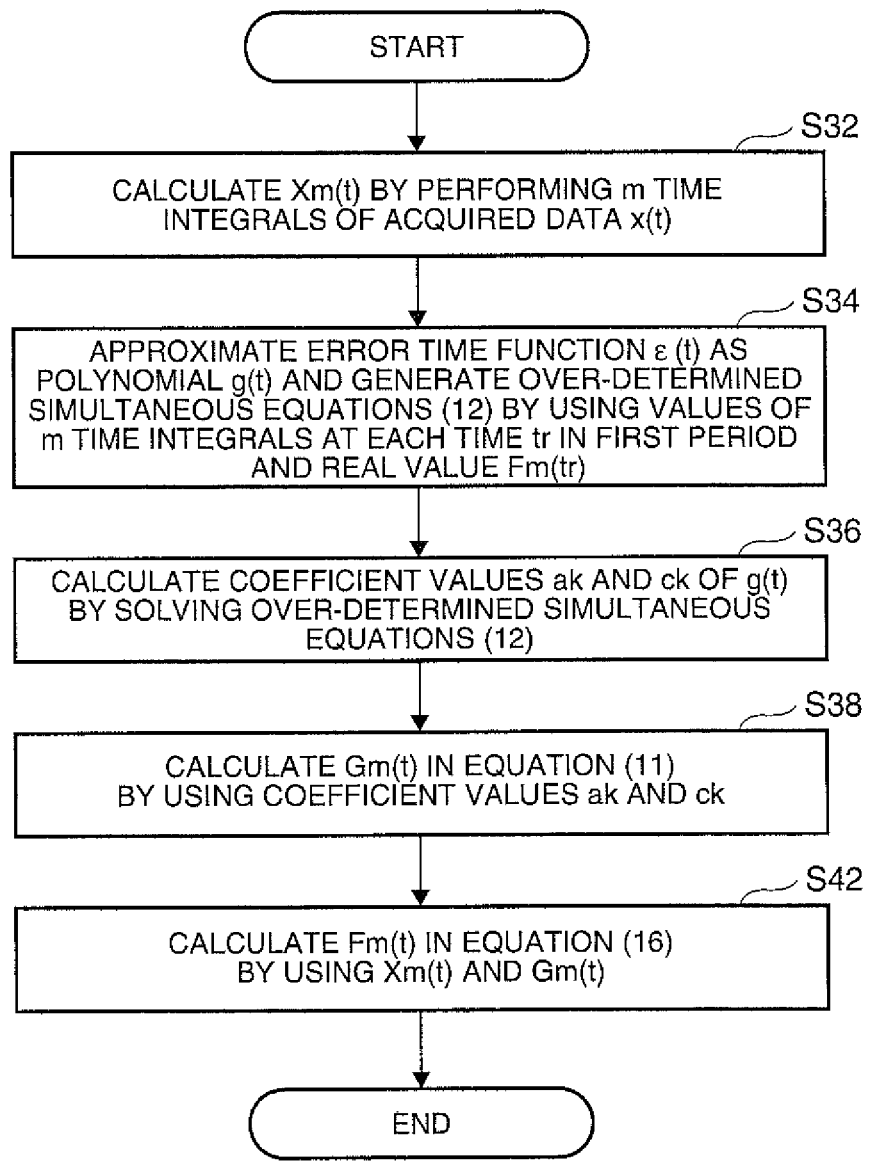
FIG. 4 is a flowchart illustrating a process of estimating an error time function and a data correcting process.

The flowchart of the error time function estimating process and the data correction process based on the above-described techniques are illustrated in FIG. 4.

First, them time integrals of the acquired data x(t) is performed so as to calculate $X_m(t)$ (Step S32).

Next, the error time function $\epsilon(t)$ is approximated as a polynomial equation g(t), and Equation (13) as the over-determined simultaneous equations is generated by using the value $X_m(t_r)$ of the m time integrals at each time $t_r$ in the first period and the real value $F_m(t_r)$ (Step S34).

Next, the Equation (13) as the over-determined simultaneous equations generated in Step S34 is solved so as to calculated the coefficient values $a_K$ and $c_K$ of g(t) (Step S36).

Next, $G_m(t)$ is calculated from Equation (11) by using the coefficient values $a_K$ and $c_K$ calculated in Step S36 (Step S38).

Finally, $F_m(t)$ is calculated from Equation (16) by using $X_m(t)$ calculated in Step S32 and $G_m(t)$ calculated in Step S36 (Step S42).

Here, the process of Steps S32 to S38 corresponds to the process of Step S30 illustrated in the flowchart of FIG. 2, and the process of Step S42 corresponds to the process of Step S40 illustrated in the flowchart of FIG. 2.

As described above, according to the motion analyzing apparatus of this embodiment, motion analysis information having sufficient accuracy can be generated by estimating the error time function of the output data of the sensor unit 10 and correcting the value of the m time integrals of the output data of the sensor unit 10. In addition, according to this embodiment, the sensor is used instead of the infrared camera, and accordingly, a motion analyzing apparatus that has a simple configuration and can be easily handled can be realized.

In addition, according to this embodiment, by approximating the error time function as a polynomial equation, the error time function can be estimated with sufficient accuracy, for example, through relatively simple calculation as Equation (15). In addition, by acquiring more data for the first period and setting up Equation (13) as the over-determined simultaneous equations, the estimation accuracy of the error time function can be raised.

Experimental Example of Motion Analysis

Next, an experimental example will be described to which the motion analyzing technique of this embodiment is applied. In this experimental example, the sensor unit 10 configured as shown in FIG. 5 is installed to a grip end of a tennis racket as an analysis target object as shown in FIG. 6, and the trajectories (an example of the motion analysis information) of the top 302 and the grip end 304 of the tennis racket when the test subject hits a tennis ball are represented.

Figure 5:
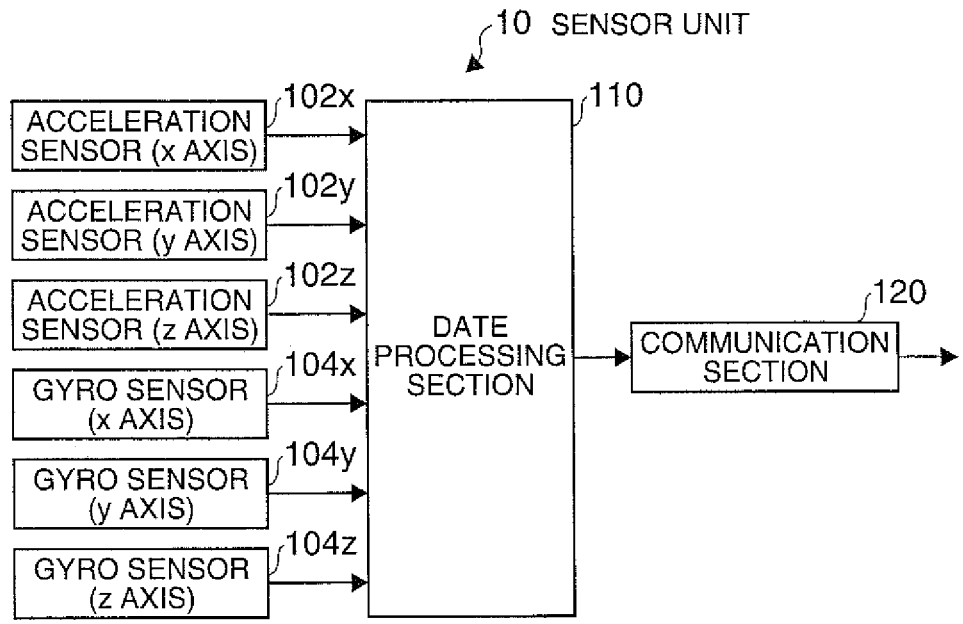
FIG. 5 is a schematic diagram showing the configuration of a sensor unit in this experimental example.
Figure 6:
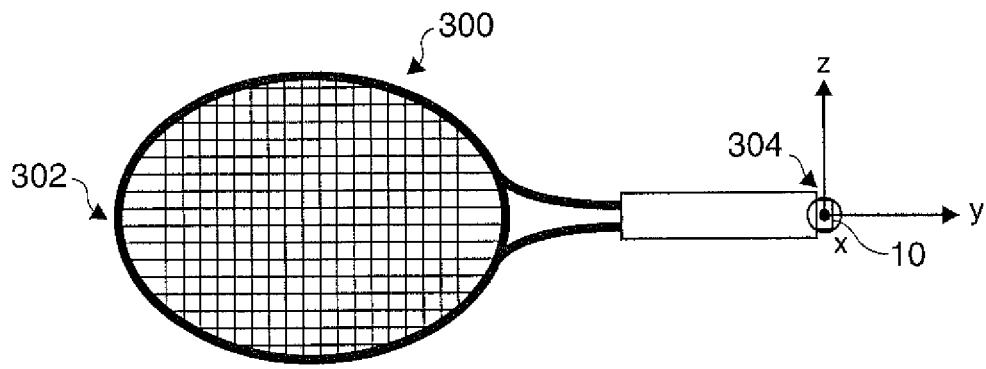
FIG. 6 is a diagram showing an example of installation of the sensor unit in this experimental example.

As shown in FIG. 5, the sensor unit 10 used in this experimental example includes a six-axis motion sensor that is configured by three axis acceleration sensors 102x, 102y, and 102z (examples of inertial sensors) that detect the acceleration in the directions of the X axis, the Y axis, and the Z axis and three axis gyro sensors (angular velocity sensors) 104x, 104y, and 104z that detect the angular velocities in the directions of the X-axis, the Y-axis, and the Z-axis, as the sensor 100 shown in FIG. 1. The X-axis, the Y-axis, and the Z-axis are determined based on the right-hand system.

The data processing section 110 synchronizes the output data of the six-axis motion sensor and outputs the synchronized data to the communication section 120. In addition, the data processing section 110 performs the process of correcting a detected error due to a deviation of the installation angle of the six-axis motion sensor and the like.

The communication section 120 performs the process of transmitting the data received from the data processing section 110 to the host terminal 20.

This sensor unit 10, for example, as shown in FIG. 6, is installed to the grip end 304 of the tennis racket 300 such that the X axis is perpendicular to the face (hitting area). The installation direction of the sensor unit 10 is arbitrary. For example, as shown in FIG. 6, the sensor unit 10 is installed such that the x-axis direction is the direction of a perpendicular line extending from the inside of the sheet face toward the front side, the y-axis direction extends toward the right side in the horizontal direction, and the z-axis direction extends toward the upper side in the vertical direction.

Figure 7:
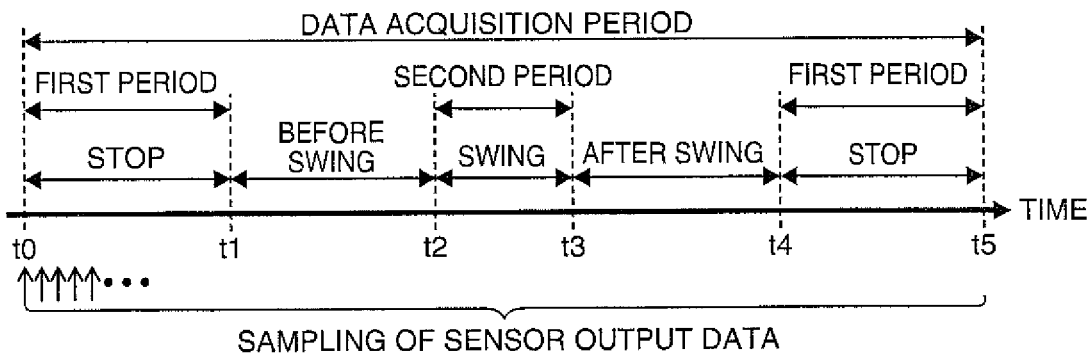
FIG. 7 is a diagram illustrating the operation sequence of a test subject in this experimental example.

In this experimental example, the test subject is allowed to perform a predetermined operation sequence. This operation sequence will be described with reference to FIG. 7. First, the tennis racket 300 is placed at a first position determined in advance and is stopped at least about one second (time t0 to t1). Next, the test subject moves to a second position with the tennis racket 300 held and prepares a swing (time t1 to t2). Next, the tennis ball is sent to the test subject, and the test subject hits the tennis ball with the tennis racket 300 (time t2 to t3). Next, after finishing the swing, the test subject moves to the first position with the tennis racket held and places the tennis racket at the first position (time t3 to t4). Finally, the tennis racket 300 is stopped for at least about one second (time t4 to t5). The period of time t0 to t5 corresponds to the data acquisition period, and, the output data of the sensor unit 10 is sampled, for example, at the sampling rate (0.5 kHz) of 500 samples per second. In addition, in the period of time t0 to t1 and the period t4 to t5, the positions of the sensor unit 10 are known and the period corresponds to the first period. Furthermore, the period of time t2 to t3 corresponds to the second period as a motion analysis target.

Figure 8:
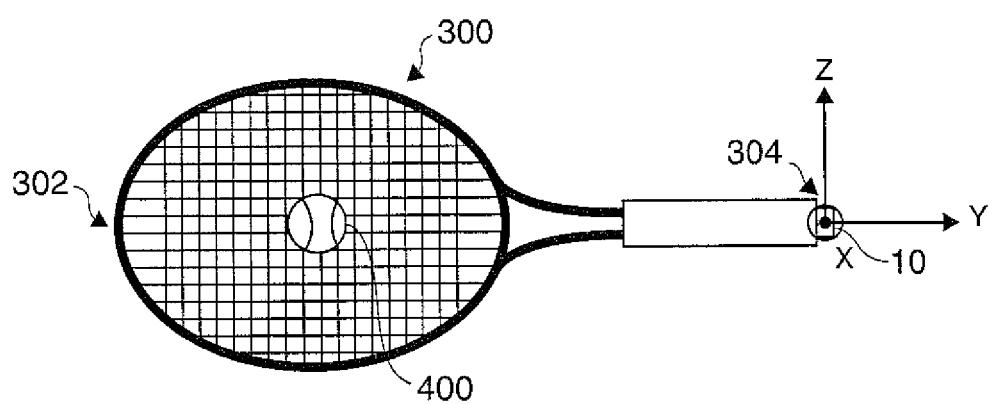
FIG. 8 is a diagram illustrating the definition of a coordinate system in this experimental example.

In addition, in this experimental example, as shown in FIG. 8, the position of the sensor unit 10 at a time when the top 302 of the tennis racket 300 is at a maximum speed (immediately before the face of the tennis racket 300 is hit by the tennis ball 400) is set as the origin point, the direction of the maximum speed of the top 302 is set to the X axis, and the Y axis and the Z axis are determined based on the right-hand system. Then, the trajectories of the top 302 and the grip end 304 of the tennis racket 300 in the XYZ coordinate system for the second period (the period of time t2 to t3) are displayed as graphs.

Figure 9:
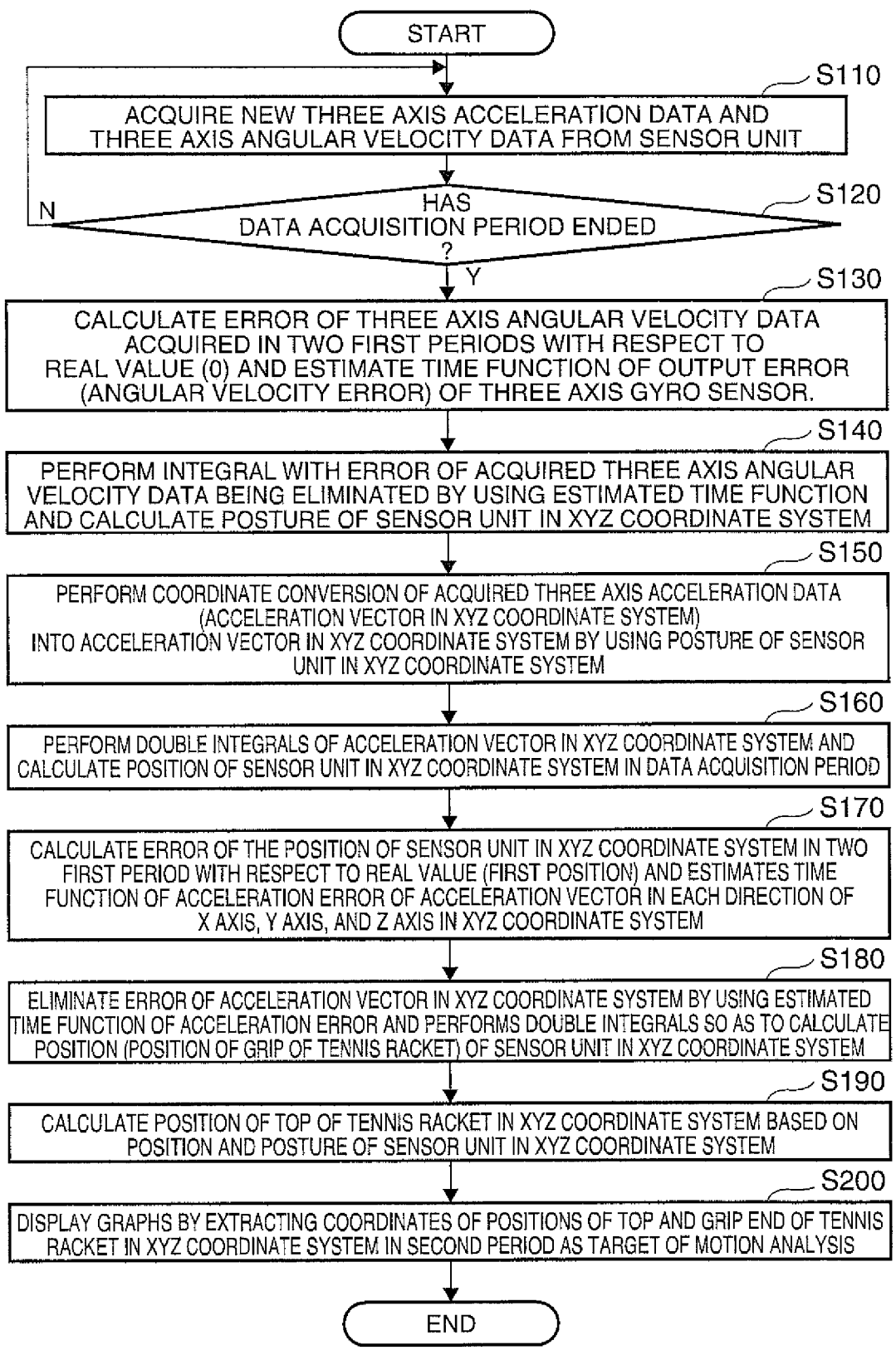
FIG. 9 is a flowchart showing the process performed by a processing unit in this experimental example.

FIG. 9 is a flowchart of the process after the processing unit 200 starts to acquire the output data of the sensor unit 10 until the trajectories of the top 302 and the grip end 304 of the tennis racket 300 for the second period in the XYZ coordinate system are displayed as graphs.

First, until the data acquisition period ends (No in Step S120), new three-axis acceleration data and three-axis angular velocity data are periodically acquired from the sensor unit 10 (Step S110).

Next, when the data acquisition period ends (Yes in Step S120), an error with respect to the real value (0) of the three-axis angular velocity data acquired in two first periods (the period of time t0 to t1 and the period of time t4 to t5) in Step S110 is calculated, and the time function of the output error (an error in the angular velocity) of the three axis gyro sensors is estimated (Step S130). For example, the time function of the angular velocity error may be estimated through approximation as a polynomial equation.

Next, by using the time function estimated in Step S130, integration is performed with the error of the three axis angular velocity data acquired in Step S110 being eliminated, and the posture of the sensor unit 10 in the XYZ coordinate system is calculated (Step S140).

Next, by using the posture of the sensor unit 10 in the XYZ coordinate system that is calculated in Step S140, coordinate conversion of the three axis acceleration data (an acceleration vector in the xyz coordinate system) acquired in Step S110 into the acceleration vector in the XYZ coordinate system is performed (Step S150).

Next, the acceleration vector in the XYZ coordinate system that is acquired through the coordinate conversion of Step S150 is double-integrated, and the positions of the sensor unit 10 in the XYZ coordinate system for the data acquisition period (the period of time t0 to t5) are calculated (Step S160).

Next, the error with respect to the real value (the first position) of the position of the sensor unit 10 in the XYZ coordinate system for the two first periods (the period of time t0 to t1 and the period of time t4 to t5) is calculated, and the time function of the acceleration error in each direction of the X-axis, the Y-axis, and the Z-axis of the acceleration vector in the XYZ coordinate system is estimated (Step S170).

Next, by using the time function of the acceleration error that is estimated in Step S170, double integration is performed with the error of the acceleration vector in the XYZ coordinate system being eliminated, and the position (the position of the grip end 304 of the tennis racket 300) of the sensor unit 10 in the XYZ coordinate system is calculated (Step S180).

Next, the distance and the direction from the sensor unit 10 to the top are measured in advance and are known, and the position of the top 302 of the tennis racket 300 in the XYZ coordinate system is calculated based on the position of the sensor unit 10 in the XYZ coordinate system that is calculated in Step S160 and the posture of the sensor unit 10 in the XYZ coordinate system that is calculated in Step S140 (Step S190).

Finally, the coordinates of the positions of the top 302 and the grip end 304 of the tennis racket 300 in the XYZ coordinate system for the second period (the period of time t2 to t3) as a motion analysis target are extracted and are displayed as graphs (Step S200).

Figure 10A:
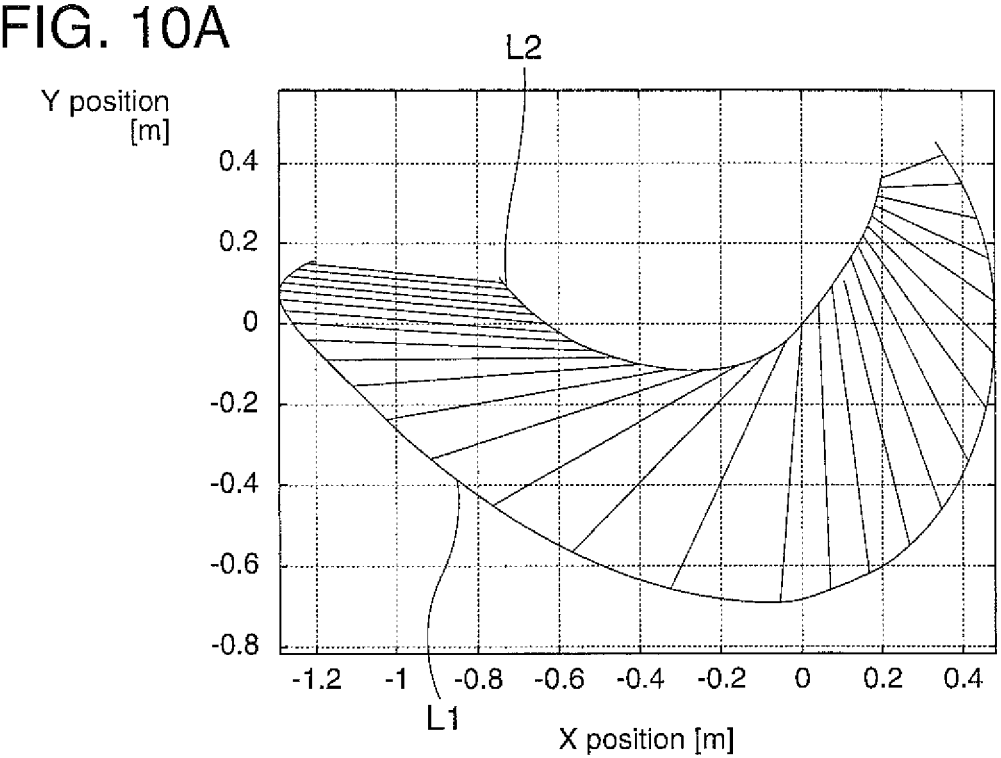
FIGS. 10A and 10B are diagrams showing trajectory data in this experimental example.
Figure 10B:
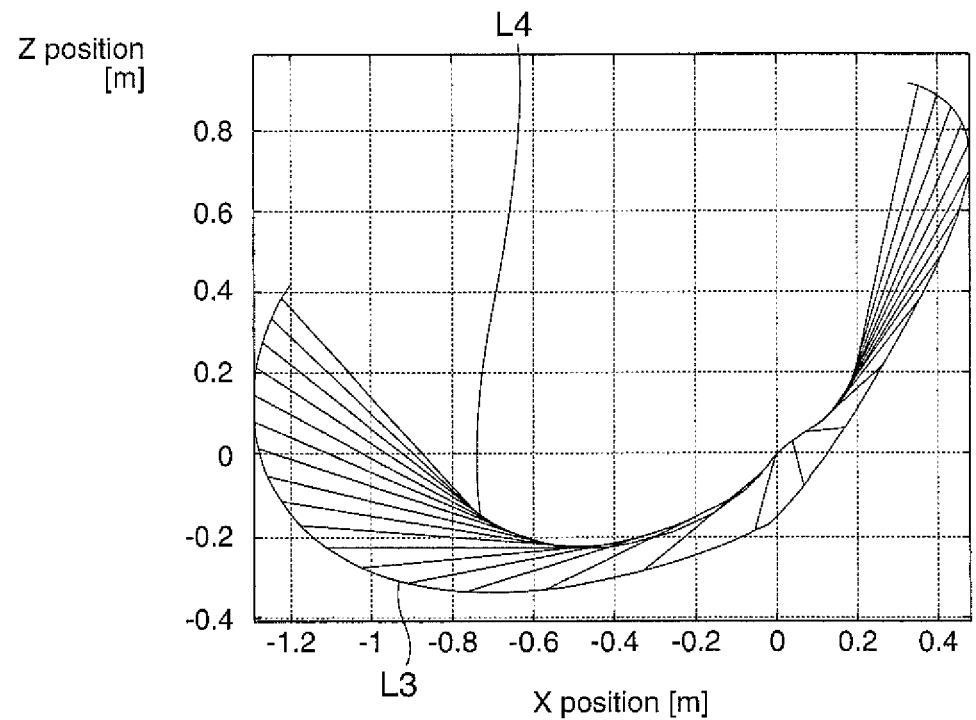

FIGS. 10A and 10B are diagrams showing an example of the trajectories of the top 302 and the grip end 304 of the tennis racket 300 for the second period (the period of time t2 to t3). FIG. 10A illustrates the trajectories in the X-Y plane, and FIG. 10B illustrates the trajectories in the X-Z plane. In FIG. 10A, a curve denoted by L1 is the trajectory of the top 302, and a curve denoted by L2 is the trajectory of the grip end 304. In addition, in FIG. 10B, a curve denoted by L3 is the trajectory of the top 302, and a curve denoted by L4 is the trajectory of the grip end 304. The trajectories shown in FIGS. 10A and 10B are appropriate for the trajectory of an actual swing.

Figure 11A:
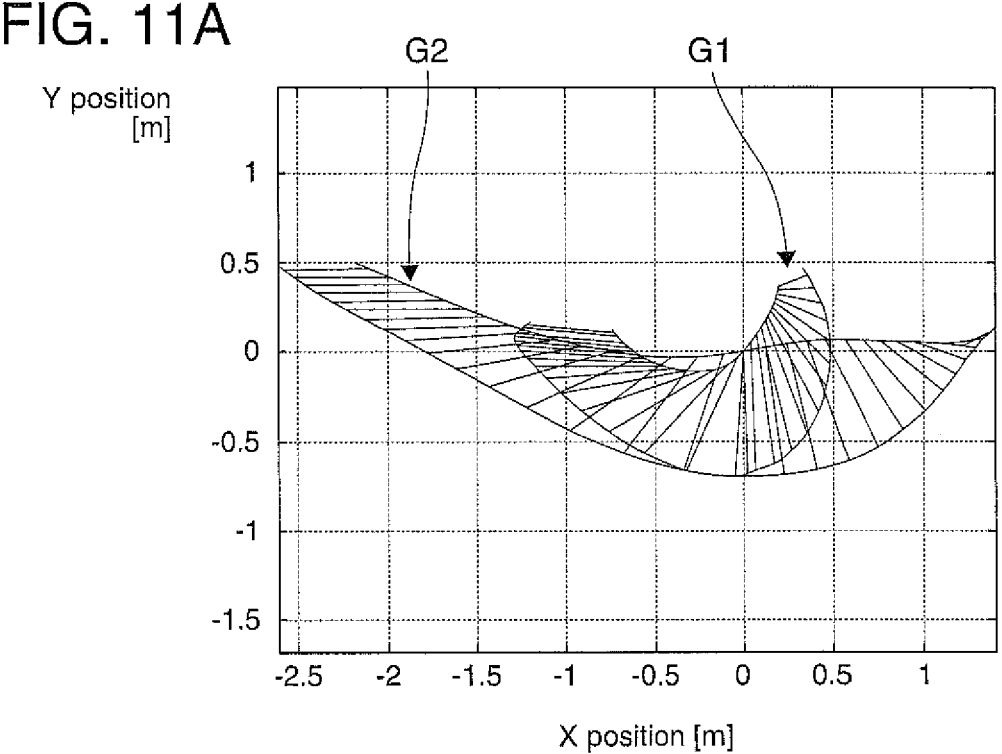
FIGS. 11A and 11B are diagrams for comparing trajectory data according to a technique of this embodiment and trajectory data according to a general technique.
Figure 11B:
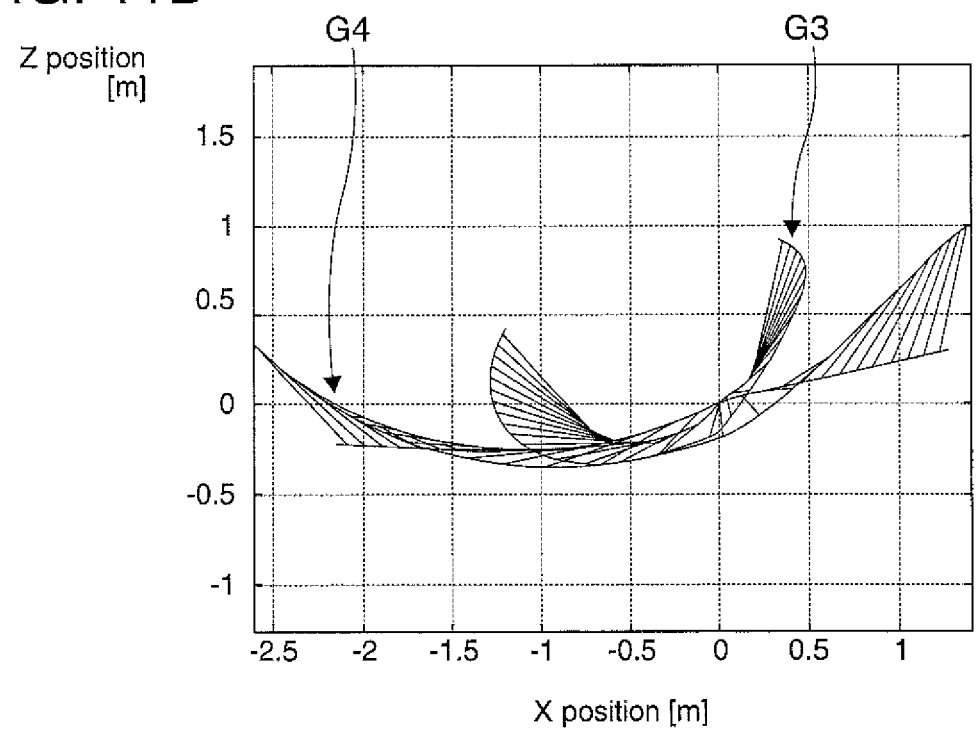

For a comparison, FIGS. 11A and 11B are diagrams acquired by displaying the trajectories in an overlapping manner in a case where a general technique of integrating without correction of the error of the three axis acceleration data in the trajectories shown in FIGS. 10A and 10B. In FIG. 11A, a trajectory graph G1 is a graph (a trajectory graph in the XY plane in a case where the technique of this embodiment is applied) of the trajectory shown in FIG. 10A, and a trajectory graph G2 is a graph of the trajectory in the XY plane in a case where a general technique is applied. In addition, in FIG. 11B, a trajectory graph G3 is a graph (a trajectory graph in the XZ plane in a case where the technique of this embodiment is applied) of the trajectory shown in FIG. 10B, and a trajectory graph G4 is a graph of the trajectory in the XZ plane in a case where a general technique is applied. Based on FIGS. 11A and 11B, in the trajectory graphs G2 and G4 in a case where a general technique is applied, there is a displacement of 4 m in the X-axis direction, and it is apparent that the trajectory does not match an actual swing trajectory. Based on this result, it can be understood that, by applying the technique of this embodiment, the accuracy of the swing trajectory is improved to a large extent.

The invention is not limited to this embodiment, and various modifications can be made therein within the scope of the concept of the invention.

For example, in this embodiment, a case has been described as an example in which position data that is acquired by performing double time integration of the acceleration data is corrected. However, as another example, speed data acquired by performing time integration of the acceleration data once may be corrected. In such a case, for example, in a case where the first period is set as a period in which the target object is stopped, the speed is zero for the first period, and the time function of the acceleration error can be estimated. By correcting the speed as above, for example, the swing speed of a tennis racket, a golf club, a bat, or the like can be measured with high accuracy. As another example, data of an angle (rotation angle) of one axis rotation that is acquired by performing time integration of the angular velocity output by the gyro sensor once may be corrected. In such a case, for example, in a case where the first period is a period in which the target object is stopped, the rotation angle for the first period is set to zero, and the time function of the acceleration error can be estimated. By correcting the rotation angle as above, for example, the rotation angle of the hit area immediately after a tennis racket, a golf club, or the like is hit by a ball (immediately after an impact) can be measured with high accuracy.

The invention includes a configuration (for example, a configuration that has the same function, the same method, and the same result or a configuration that has the same object and the same effects) that is substantially the same as the configuration described in the embodiment. In addition, the invention includes a configuration acquired by substituting a non-essential part of the configuration described in the embodiment. Furthermore, the invention includes a configuration that exhibits the same operations and effects as those of the configuration described in the embodiment or a configuration that can achieve the same object as that of the embodiment. In addition, the invention includes a configuration acquired by adding known techniques to the configuration described in the embodiment.

The entire disclosure of Japanese Patent Application No. 2010-259234, filed Nov. 19, 2010 is expressly incorporated by reference herein.

What is claimed is:

1. A motion analyzing apparatus comprising:
   a data acquisition unit that acquires output data of a sensor unit in a period including a first period for which a real value of a value of m time integrals (here, m is an integer equal to or greater than one) of the physical amount is known and a second period that is a target for motion analysis;
   a data correcting unit that corrects a value of m time integrals of the output data for the second period based on a difference between a value of m time integrals of the output data and the real value for the first period; and
   a motion analysis information generating unit that generates motion analysis information of the target object based on the value of the m time integrals for the second period that is corrected by the data correcting unit.

2. The motion analyzing apparatus according to claim 1, wherein an error time function estimating unit that estimates a time function of an error of a value of the physical amount detected by the sensor unit with respect to the real value based on the difference between a value of m time integrals of the output data and the real value for the first period.

3. The motion analyzing apparatus according to claim 2, wherein the error time function estimating unit estimates the time function of the error by approximating the time function of the error as a polynomial equation and calculating coefficients of the polynomial equation.

4. The motion analyzing apparatus according to claim 2,
   wherein a plurality of the first periods is set, and
   wherein the error time function estimating unit estimates the time function of the error based on data for each of the plurality of the first periods that is acquired by the data acquiring unit.

5. The motion analyzing apparatus according to claim 4,
wherein at least one of the plurality of the first periods is a period before start of the second period, and
wherein at least one of the plurality of the first periods is a period after end of the second period.

6. The motion analyzing apparatus according to claim 1, wherein the first period is a period in which the target object is stopped.

7. The motion analyzing apparatus according to claim 1, wherein the sensor unit detects at least one of acceleration and angular velocity as the physical amount.

* * * * *